US007802514B2

(12) United States Patent
Lin

(10) Patent No.: US 7,802,514 B2
(45) Date of Patent: Sep. 28, 2010

(54) LOCKING STRUCTURE OF HOT BEVERAGE MACHINE WITH STEAM SEALING DEVICE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 577 days.

(21) Appl. No.: 11/758,172

(22) Filed: Jun. 5, 2007

(65) Prior Publication Data
US 2008/0302249 A1 Dec. 11, 2008

(51) Int. Cl.
*A47J 31/00* (2006.01)
*A47J 31/42* (2006.01)
(52) U.S. Cl. .................................. 99/289 R; 99/302 R
(58) Field of Classification Search .............. 99/279, 99/284, 289 R, 290, 293, 295, 317, 318, 302 R, 99/302 P, 297, 306, 305, 280; 219/687, 725, 219/689, 729, 730, 734, 735, 759, 762; 426/107, 426/113, 234, 241; *A47J 31/30, 31/44*
See application file for complete search history.

(56) References Cited
U.S. PATENT DOCUMENTS

| | | | | |
|---|---|---|---|---|
| 2,358,556 A | * | 9/1944 | Block | ..................... 99/321 |
| 3,997,313 A | * | 12/1976 | Alexander | ................. 65/32.5 |
| 4,389,924 A | * | 6/1983 | Hoesselbarth | ............. 99/289 R |
| 5,913,962 A | * | 6/1999 | Gasser et al. | ................. 99/293 |
| RE37,238 E | * | 6/2001 | Song | ........................... 99/469 |
| 6,481,338 B1 | * | 11/2002 | Wai | ........................ 99/302 R |
| 6,901,846 B2 | * | 6/2005 | Ruckstuhl | ..................... 99/287 |
| 6,935,222 B2 | * | 8/2005 | Chen et al. | ................ 99/302 R |
| 7,441,495 B2 | * | 10/2008 | Halle et al. | .................. 99/295 |
| 7,481,152 B2 | * | 1/2009 | Steckhan et al. | ............. 99/287 |
| 2007/0107604 A1 | * | 5/2007 | Wei | ............................... 99/279 |
| 2008/0148952 A1 | * | 6/2008 | Ruckstuhl | .................... 99/279 |
| 2009/0101021 A1 | * | 4/2009 | Tonelli et al. | ................ 99/290 |

* cited by examiner

*Primary Examiner*—Quang T Van
(74) *Attorney, Agent, or Firm*—Alan Kamrath; Kamrath & Associates PA

(57) ABSTRACT

A locking structure of a hot beverage machine with a steam sealing device is provided. The hot beverage machine has a feeder for various drinks placed with raw materials, such as coffee powder, coffee bag, tea leaves, tea bags, etc., and utilized with a sealing element, which allows steam to come in. When the machine is used, the feeder is tightly sealed with the sealing element so as to make drinks with purer flavor. Alternatively, when the machine is not in use for brewing, the feeder is separated from the sealing element with a distance such that the hot beverage machine can have a variety of different functions.

2 Claims, 8 Drawing Sheets

LOCKING STRUCTURE OF HOT BEVERAGE MACHINE WITH STEAM SEALING DEVICE

FIELD OF THE INVENTION

The present invention relates to hot beverage machines and, particularly, relates to a locking structure for a steam sealing device of a hot beverage machine having a feeder for various drinks placed with raw materials, such as coffee powder, coffee bag, tea leaves, tea bags, etc., and utilized with a sealing element, which allows steam to come in. When the machine is used, the feeder is tightly sealed with the sealing element so as to make drinks with purer flavor. Alternatively, when the machine is not in use for brewing, the feeder is separated from the sealing element with a distance such that the hot beverage machine can have a variety of different functions.

BACKGROUND OF THE INVENTION

A variety of hot beverage machines with various shapes and forms exist in the market. One type of the hot beverage machines heats up water and then brews raw material of the drink placed within the hot beverage machine by dripping hot water thereon. However, no sealing separation exists between the feeder thereof and the outside, causing high temperature steam to easily escape to the surrounding area when the drink is brewed. As a result, the raw material of the drink cannot be completely brewed by high temperature with the flavor sealed in. Consequently, the hot beverage brewed lacks of pure flavor.

SUMMARY OF THE INVENTION

The present invention improves conventional designs of hot beverage machines where a variety of drinks are made by heating steam to brew the raw material placed in an open position, resulting in the flavor generated not being as pure as expected. The purpose of the improvement is to brew beverages with purer flavor by tightly sealing a feeder of a hot beverage machine by a sealing element with easy operation.

One object of the present invention is to place in sequence a first base and a second base such that the feeder can be placed therebetween. The first base is placed in a supporting base formed in a brewing area located at the front of a water container disposed in the back of the hot beverage machine, and the second base is formed with a plurality of boundary holes thereon.

Another object of the present invention is to integrally assemble the sealing element combined with a steam filter net and a connecting member. A top surface of the connecting member is provided with a steam tube passing therethrough and containing a flexible stopping element with high temperature resistance and a positioning lever adjacent to the stopping element. A boundary element with a through hole at one end is combined with an opening end of the steam tube such that the positioning lever contained therein is movable.

Yet another object of the present invention is to combine the connecting member with a guiding member formed with sloping guiding grooves on an outer surface. Thus, one or more engaging portions extending downwardly can make a positional entrance or departure in relation to the boundary holes of the second base when the whole assembly is descended. Flanges on an outer surface of a joining member, which has grooves on an inner surface, are then set upon a top end of the guiding member. Then, a plurality of protrusions formed on an inner surface of a shifting member are correspondingly inserted into the sloping guiding grooves, such that a shifter extending from one side of the shifting member can pass between upper and lower bars assembled together in a groove of the supporting base positioned in the front of the hot beverage machine. A plurality of supporting portions extending inwardly from a periphery of the joining member are tightly combined with protrusions facing downward from the top cover. For brewing a beverage, beverage materials are placed in the feeder. Then, the shifter of the shifting member is moved toward one side so as to make the protrusions move along the guiding grooves of the guiding member. Thus, the guiding member makes a downward movement and makes the assembly of the connecting member combined therewith to move downward at the same time, so as to provide a tight seal between the connecting member and the feeder at the corresponding position of the second base of the hot beverage machine. In addition, when the steam tube at one end of the assembly of the connecting member is forced in by steam, the stopping element therein is protruded outward so as to make the adjacent positioning lever protrude from the through hole of the boundary element, thereby engaging with the corresponding groove of the joining member to form a positional restriction to prevent the joining member from shifting.

Yet another object of the present invention is to closely seal the feeder placed in the second base of the hot beverage machine with the connecting member, by moving the shifting member downward to make the connecting assembly move downward at the same time along with the guiding member when the sealing device of the hot beverage machine is in use. Thus, coffee is brewed with steam to make the drink denser.

Yet another object of the present invention is to provide a horizontal section formed at an end of each sloping guiding groove on the outer surface of the guiding member combined with the connecting member so as to receive the protrusion on the inner surface of the shifting member, hence driving it downward to make a tight seal with the feeder on the bottom. Thus, the protrusion moving into the horizontal section drives the engaging portion on the bottom of the guiding member to enter the corresponding boundary hole of the second base and serves as the locking device of the steam sealing device before steam is generated.

DETAILED DESCRIPTION OF THE EMBODIMENTS

Figure 1:
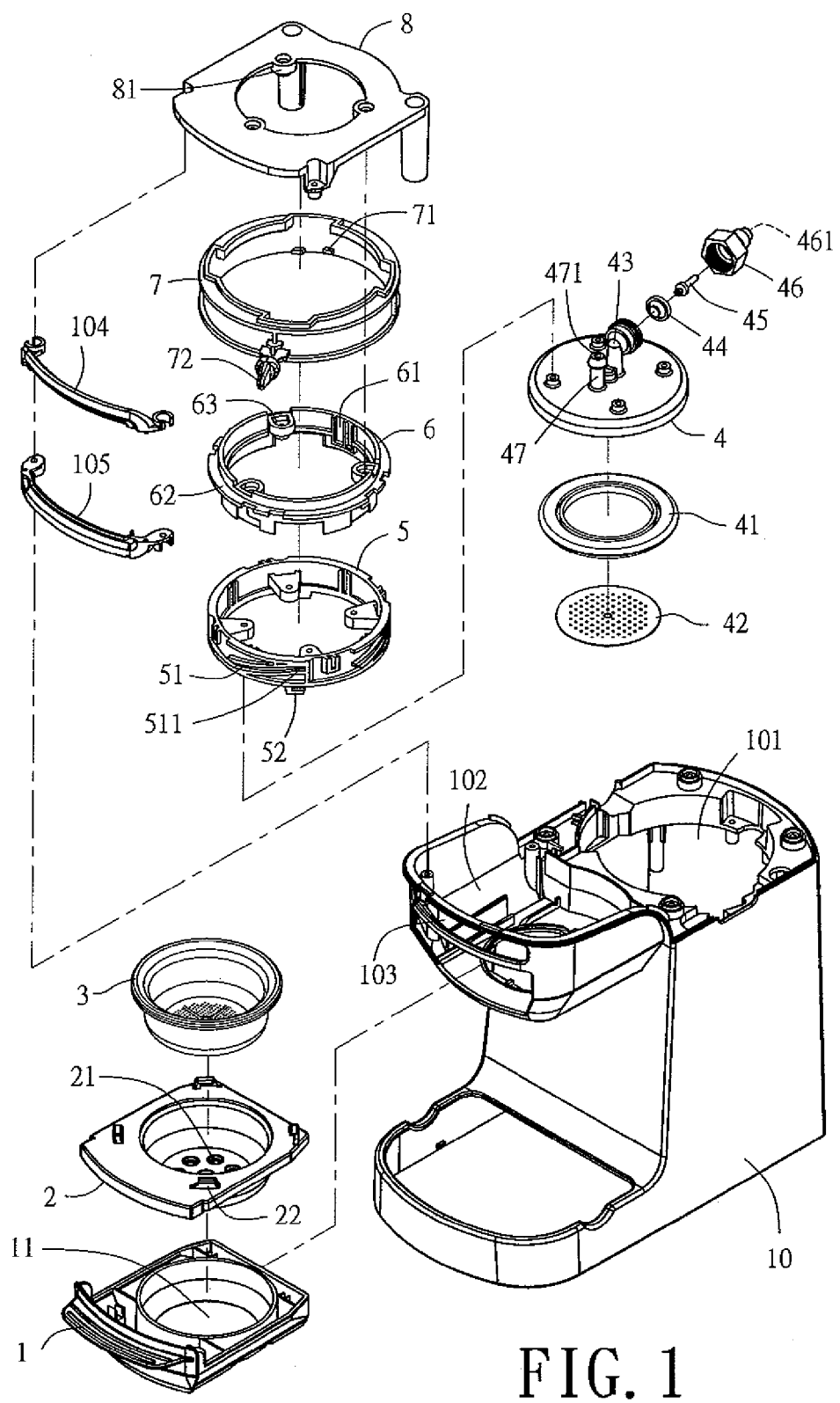
FIG. 1 is an exploded perspective view of a steam sealing device of a hot beverage machine in accordance with the present invention.
Figure 6:
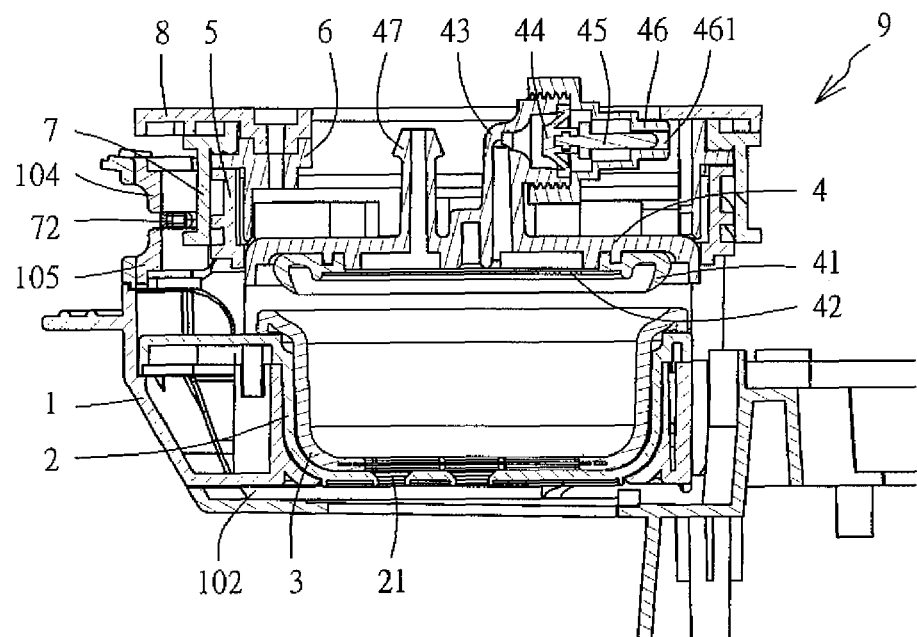
FIG. 6 is a detailed cross-sectional view taken along line 60-60 in FIG. 5.

FIGS. 1 and 6 illustrate a locking structure of a hot beverage machine 10 with a steam sealing device 9 in accordance with the present invention. The steam sealing device 9 is assembled with a supporting base 102 formed at a front brewing area of a water container 101 placed in the back of the hot beverage machine 10.

Figure 2:
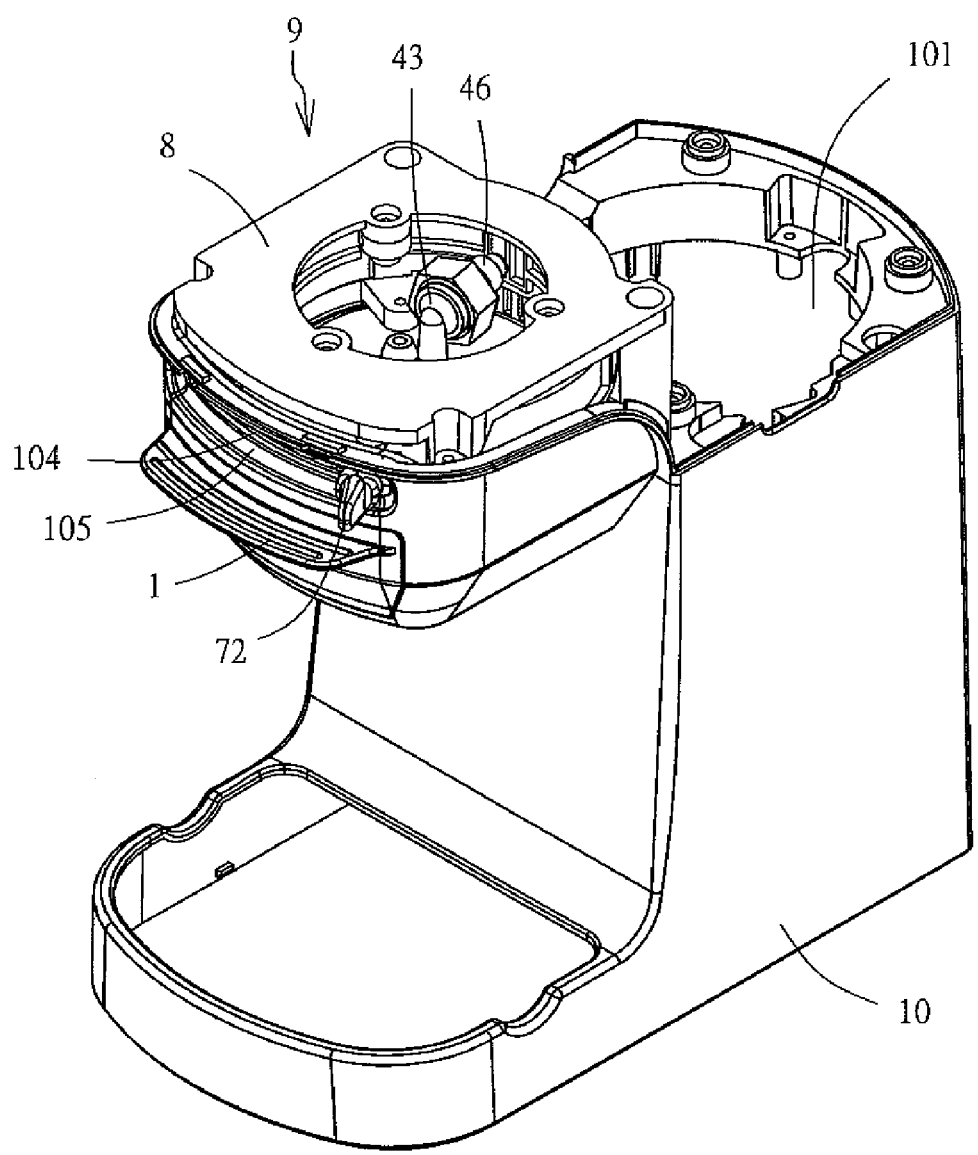
FIG. 2 is a perspective view of the hot beverage machine combined with the steam sealing device in accordance with the present invention.
Figure 3:
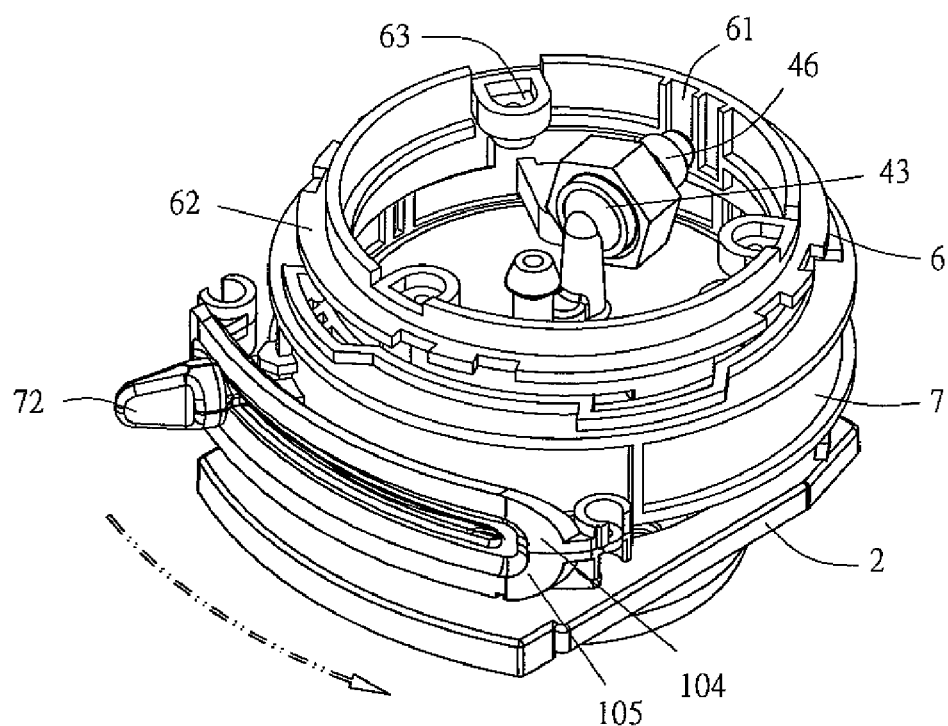
FIG. 3 is a schematic view of a shifting member of the steam sealing device before movement in accordance with the present invention.
Figure 4:
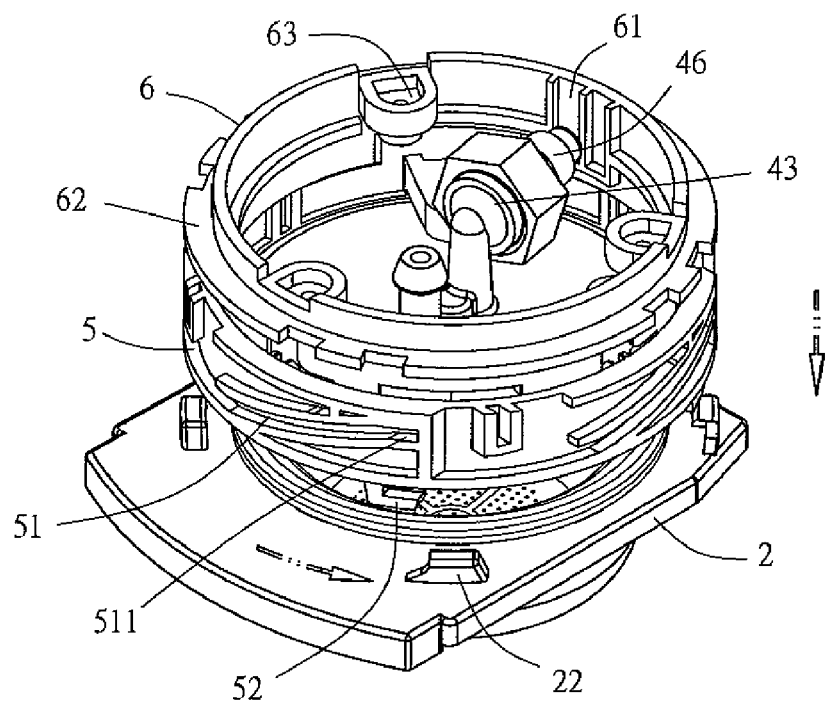
FIG. 4 is a schematic view of a guiding member of the steam sealing device of the hot beverage machine before movement in accordance with the present invention.
Figure 5:
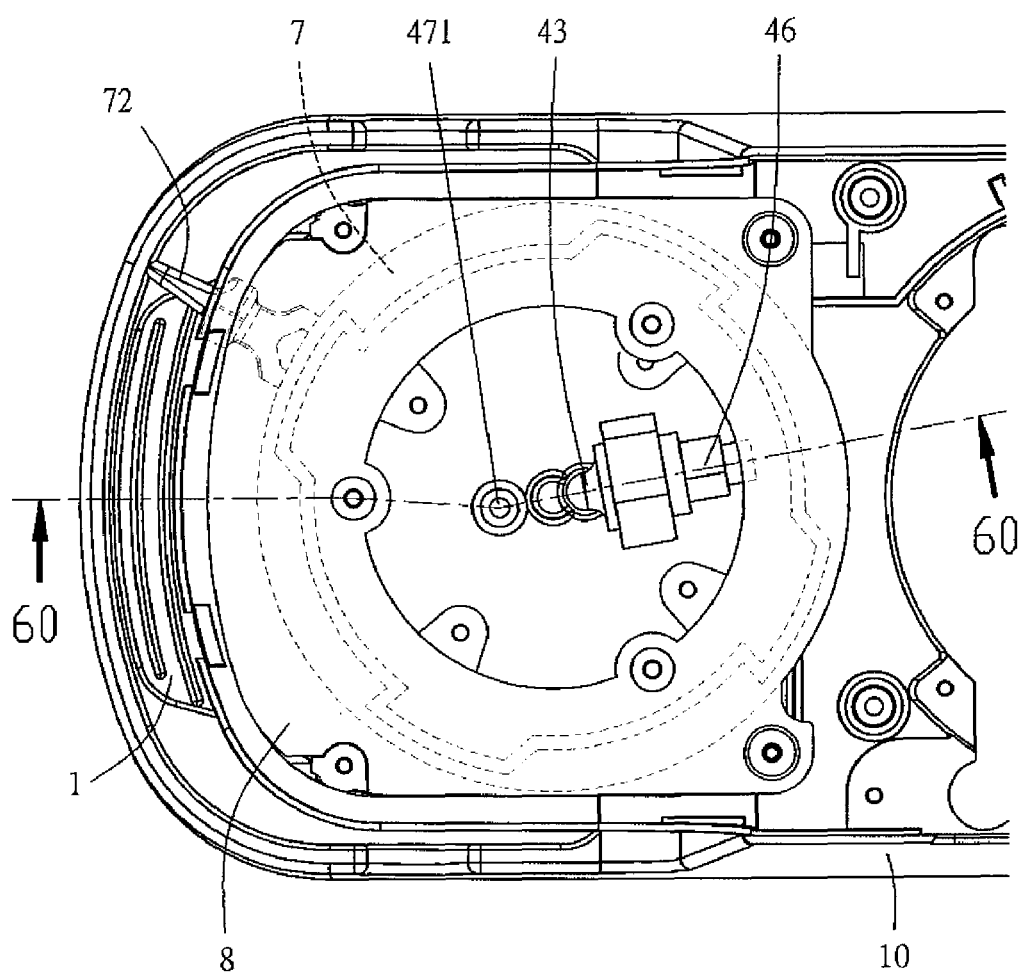
FIG. 5 is a top view of the shifting member of the steam sealing device before movement in accordance with the present invention.

The steam sealing device 9 is provided in sequence with a first base 1 having a through hole 11 on the bottom thereof and a second base 2 having a plurality of apertures 21 on the bottom thereof and one or more boundary holes 22 formed on edges as to support a feeder 3 therebetween. A sealing element 41 combined with a steam filter net 42 forms a tight assembly with the connecting member 4. A top surface of the connecting member 4 has a steam tube 43 passing therethrough and receiving a flexible stopping element 44 with high temperature resistance and a positioning lever 45 adjacent to the stopping element 44. A boundary element 46 with a through hole 461 at one end is combined with an opening end of the steam tube 43 such that the positioning lever 45 contained therein is movable. A connecting pipe 47 with a through hole 471 extending upward from the connecting member 4 can be connected with a steam pipe. The assembly of the connecting member 4 is then combined with a guiding member 5 formed with sloping guiding grooves 51 on a outer surface, such that one or more engaging portions 52 extending downwardly can make a positional entrance or departure in relation to the boundary holes 22 of the second base 2 when the whole assembly is descended. The joining member 6 has flanges 62 formed on an outer surface and one or more grooves 61 formed on an inner surface. The flanges 62 rest upon a top end of the guiding member 5. Then, a plurality of protrusions 71 formed on an inner surface of a shifting member 7 are correspondingly inserted into the sloping guiding grooves 51 on the outer surface of the guiding member 5, such that a shifter 72 extending from one side of the shifting member 7 can pass between upper and lower bars 104, 105 assembled together in a groove 103 of the supporting base 102 positioned in the front of the hot beverage machine 10, as shown in FIGS. 2 and 3. A plurality of supporting portions 63 extending inwardly from a periphery of the joining member 6 are tightly combined with protrusions 81 facing downward from the top cover 8.

Figure 7:
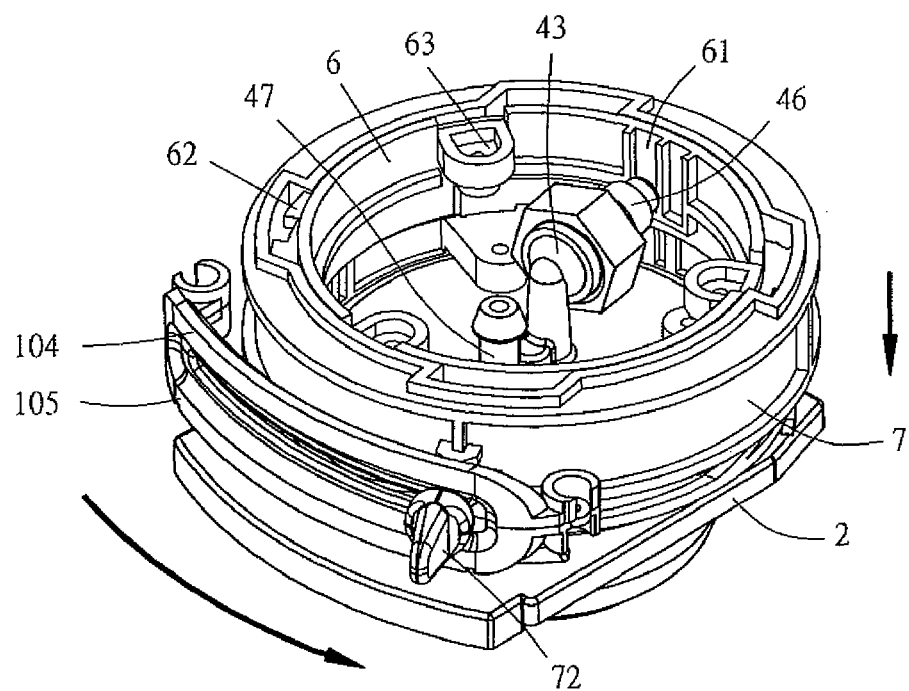
FIG. 7 is a schematic view of the shifting member of the steam sealing device after movement in accordance with the present invention.
Figure 8:
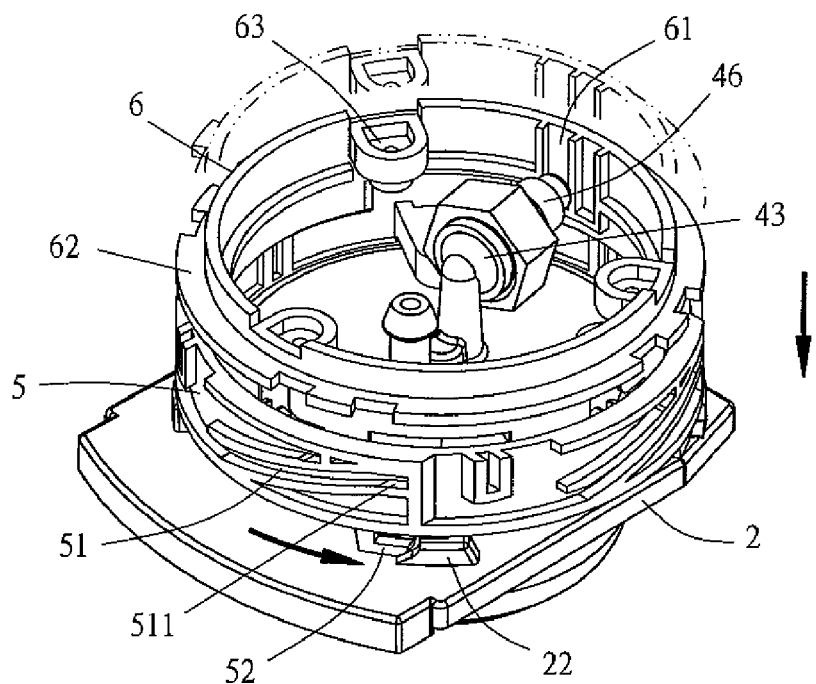
FIG. 8 is a schematic view of the steam sealing device after movement in accordance with the present invention, wherein the engaging portion on the bottom of the guiding member starts moving into a boundary hole of a second base.
Figure 9:
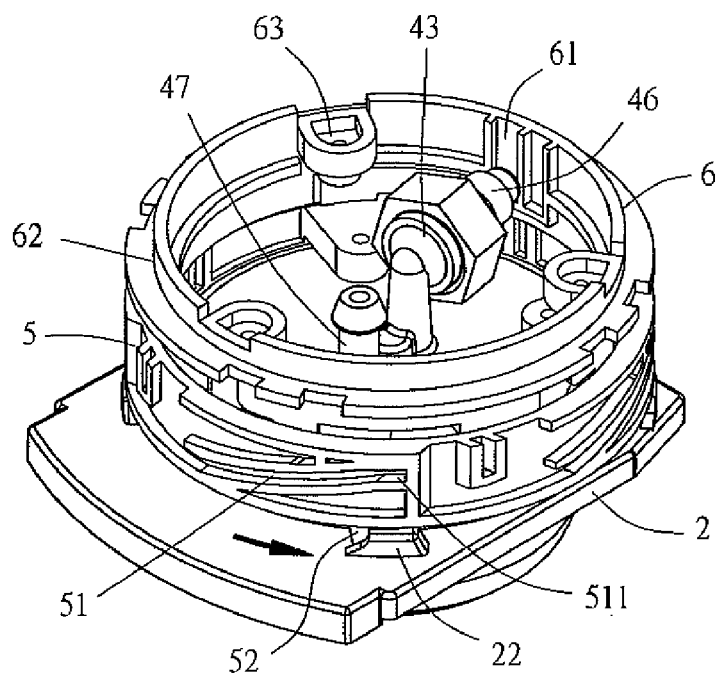
FIG. 9 is a schematic view of the steam sealing device after movement in accordance with the present invention, wherein engaging portions of the guiding member is already moved into the boundary hole of the second base.
Figure 10:
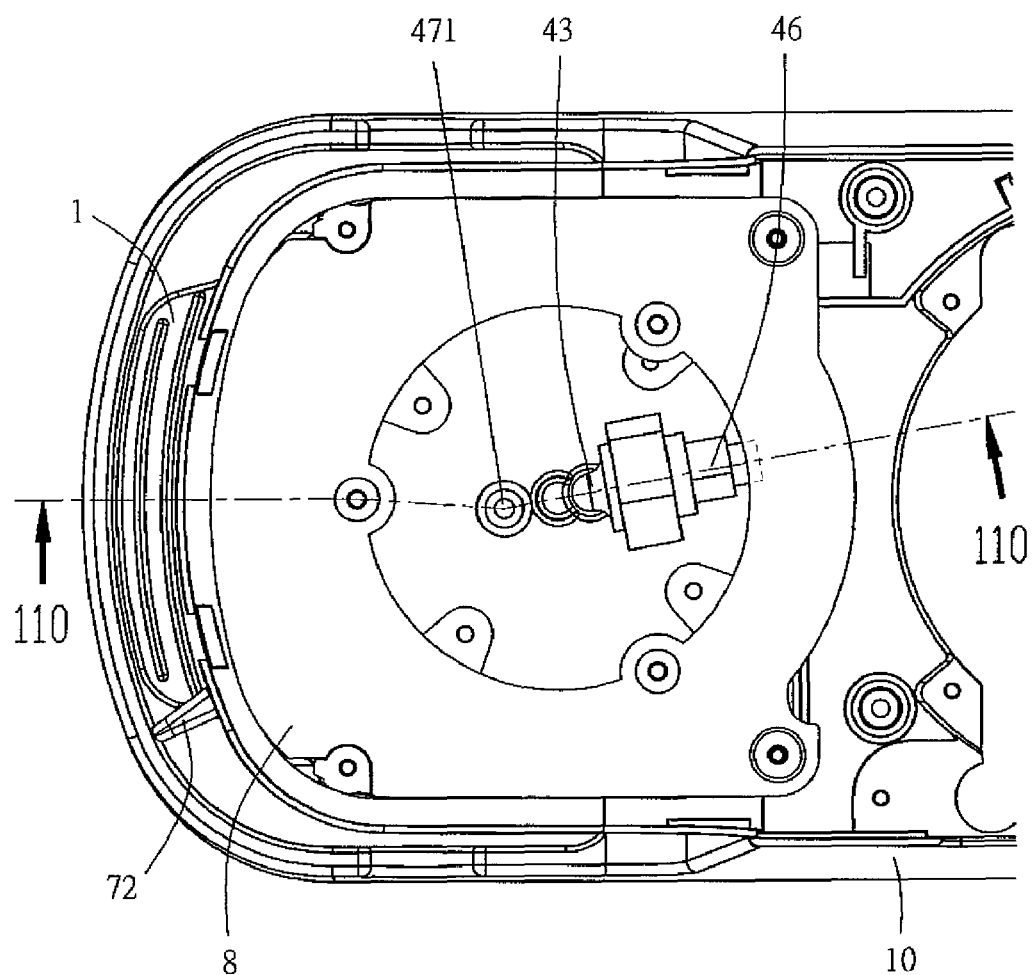
FIG. 10 is a top view of the shifting member of the steam sealing device after movement in accordance with the present invention.
Figure 11:
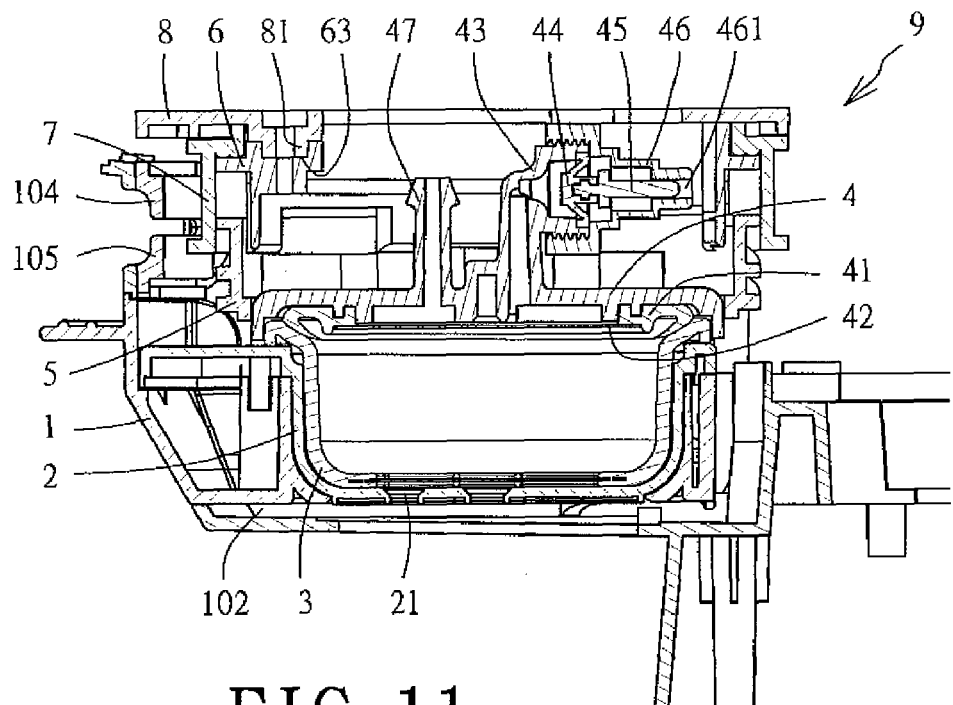
FIG. 11 is a detailed cross-sectional view taken along line 110-110 of FIG. 10.

Referring to FIGS. 3-6, for brewing a beverage, beverage material is placed in the feeder 3. Referring to FIGS. 7 and 10, the protruding shifter 72 of the shifting member 7 is then moved toward one side so as to make the protrusions 71 move along the sloping guiding grooves 51 of the guiding member 5, thereby causing the guiding member 5 to make a downward movement and make the assembly of the connecting member 4 combined therewith to move downward at the same time, as shown in FIG. 8, so as to provide a tight seal between the connecting member 4 and the feeder 3 at the corresponding position of the second base 2 of the hot beverage machine 10. Meanwhile, the engaging portion 52 of the guiding member 5 is entering into the corresponding boundary hole 22 of the second base 2. A horizontal section 511 is formed at an end of each sloping guiding groove 51 for receiving a protrusion 71 on the inner side of the shifting member 7 to drive the guiding member 5 combined with the connecting member 4 downward to seal with the feeder 3 on the bottom, as shown in FIG. 11. When the protrusion 71 moves into the horizontal section 511 and drives the engaging portion 52 on the bottom of the guiding member 5 to enter the corresponding boundary hole 22 of the second base 2, as shown in FIG. 9, it serves as the locking device of the steam sealing device 9 before steam is generated. When the steam tube 43 at one end of the assembly of the connecting member 4 is forced in by steam 91, the stopping element 44 therein is protruded outward, as shown in FIG. 12, so as to make the adjacent positioning lever 45 protrude from the through hole 461 of the boundary element 46, thereby engaging with the corresponding groove 61 of the joining member 6 to form a positional restriction to prevent the joining member 6 from shifting.

Figure 12:
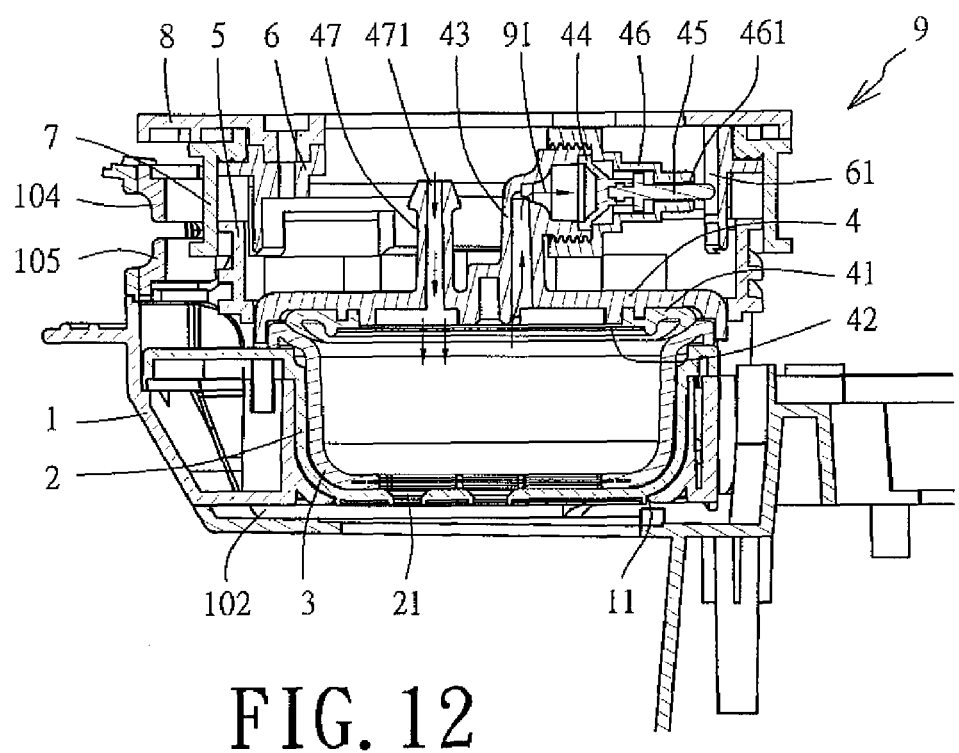
FIG. 12 is a schematic view of the steam sealing device after movement in accordance with the present invention where steam enters to push a positional lever outward to a groove of a joining member.

As shown in FIG. 12, when a beverage is brewed in the steam sealing device 9 of the supporting base 102 positioned in the front of the hot beverage machine 10, the shifting member 7 is used to make a positional shift to stop the guiding member 5. When guiding member 5 is descended, the assembly of the connecting member 4 is descended along with it, thereby creating a tight seal with the feeder 3 placed on the corresponding second base 2 of the hot beverage machine 10. As a result, the coffee brewed by steam is denser.

The above assembly having the steam sealing device provided in the front supporting base of the hot beverage machine has the following advantages when brewing a variety of drinks:

1. When brewing beverages with the hot beverage machine assembled with the steam sealing device according to the present application, a user just needs to move the shifter of the shifting member toward one side so as to make the protrusions of the shifting member move along the guiding grooves of the guiding member to drive the guiding member to move downward along with the assembly of the connecting member combined therewith. Thus, a tight seal is formed between guiding member and the feeder placed in the corresponding second base of the hot beverage machine. As a result, beverage materials placed in the feeder can be sealed by steam and brewed completely with steam.

2. When the steam sealing device is sealed, the steam tube at one end of the connecting member can push the stopping element therein outward after the steam comes in. Thus, the adjacent positioning lever is protruded from the through hole of the boundary element so as to correspondingly engage to the groove of the joining member, forming a position restriction to the movement of the joining member.

3. The shifting member of the steam sealing device is used to descend the guiding member along with the assembly of the connecting member combined therewith. Thus, a tight seal is formed between the guiding member and the feeder placed on the corresponding second base of the hot beverage machine, and steam will not escape and will make the brewed coffee denser.

4. A horizontal section is formed at an end of each sloping guiding groove formed on the outer surface of the guiding member combined with the connecting member so as to receive the protrusion on the inner surface of the shifting member, hence driving it downward to make a tight seal with the feeder on the bottom. Thus, the protrusion moving into the horizontal section drives the engaging portion on the bottom of the guiding member to enter the corresponding boundary hole of the second base and serves as the locking device of the steam sealing device before steam is generated.

What is claimed is:

1. A locking structure of a hot beverage machine with a steam sealing device, wherein the steam sealing device is provided in a front supporting base of said hot beverage machine, with the locking structure comprising:
    a base having a boundary hole;
    a feeder supported on the base;
    a sealing element with a steam filter net received on the sealing element;
    a connecting member having an engaging portion on a bottom thereof, with the engaging portion having a locked position entered into the boundary hole and an unlocked position out of the boundary hole, with the engaging portion pivotably moveable relative to the base from the unlocked position to the lock position;
    a guiding member having an outer surface, with the connecting member fixed to the guiding member to prevent relative movement, with the sealing element, the connecting member and the feeder forming a tight assembly;
    a joining member resting on the guiding member;
    a shifting member pivotably positioned on the joining member; and
    a top cover on the shifting member, with the top cover fixed to the joining member to prevent relative movement;
    wherein horizontal sections are respectively formed at ends of sloping guiding grooves on the outer surface of said guiding member, wherein protrusions are formed on an inner surface of said shifting member and received in the sloping guiding grooves, with rotation of the shifting member relative to the joining member while the protrusions are received in the sloping guiding grooves causing the guiding member to move downward to make a tight seal with the feeder on the bottom, wherein the protrusions moving into the horizontal sections drive the engaging portion on the bottom of the guiding member to enter the boundary hole of the base.

2. The locking structure of a hot beverage machine of claim 1 wherein the connecting member includes a steam tube having a positioning lever, with the joining member including an inner surface having a groove, with the positioning lever moveable from a protruded position received in the groove of the joining member and a retracted position removed from the groove of the joining member, with the positioning lever being moveable from the retracted position to the protruded position by steam.

* * * * *